(12) United States Patent
Reveley et al.

(10) Patent No.: US 11,679,883 B2
(45) Date of Patent: Jun. 20, 2023

(54) ADJUSTABLE SINGLE AXIS TENSIONER FOR MOVABLE AIRCRAFT HEADRESTS

(71) Applicant: AMI Industries, Inc.

(72) Inventors: Benjamin Anthony Calvillo Reveley, Colorado Springs, CO (US); Keith M. Ferguson, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 302 days.

(21) Appl. No.: 16/995,418

(22) Filed: Aug. 17, 2020

(65) Prior Publication Data
US 2022/0048631 A1    Feb. 17, 2022

(51) Int. Cl.
*B64D 11/06* (2006.01)
*B60N 2/897* (2018.01)
*B60N 2/806* (2018.01)
*B60N 2/68* (2006.01)

(52) U.S. Cl.
CPC ............ *B64D 11/0646* (2014.12); *B60N 2/68* (2013.01); *B60N 2/806* (2018.02); *B60N 2/897* (2018.02)

(58) Field of Classification Search
CPC ..... B64D 11/0642; B60N 2/812; B60N 2/897
See application file for complete search history.

(56) References Cited

U.S. PATENT DOCUMENTS

| | | | |
|---|---|---|---|
| 3,578,384 A | 5/1971 | Leichtl | |
| 4,111,484 A | 9/1978 | Jaeger | |
| 4,607,886 A | 8/1986 | Mazhar | |
| 7,770,977 B2 | 8/2010 | Diller | |
| 2013/0285431 A1 | 10/2013 | Turletti et al. | |
| 2015/0145306 A1* | 5/2015 | Zimmermann | ........ B60N 2/818 297/391 |
| 2019/0092198 A1* | 3/2019 | Inoue | ...................... B60N 2/682 |
| 2020/0079261 A1* | 3/2020 | Iossifidis | ................ B60N 2/897 |

FOREIGN PATENT DOCUMENTS

| | | | | |
|---|---|---|---|---|
| CN | 104442483 A | * | 3/2015 | |
| DE | 102005033067 A1 | | 1/2007 | |
| DE | 102009030896 A1 | | 2/2010 | |
| EP | 3218223 B1 | | 9/2018 | |
| FR | 2912356 A1 | * | 8/2008 | ........... B60N 2/4814 |
| JP | H0259649 U | | 5/1990 | |
| JP | 2004016710 A | | 1/2004 | |
| WO | 1998051530 A1 | | 11/1998 | |
| WO | WO-2013021485 A1 | * | 2/2013 | ............... B60N 2/68 |
| WO | WO-2018015691 A1 | * | 1/2018 | ............. B60N 2/809 |

OTHER PUBLICATIONS

Extended Search Report for European Application No. 21191327.2 dated Jan. 7, 2022, 6 pages.

* cited by examiner

*Primary Examiner* — Timothy J Brindley

(74) *Attorney, Agent, or Firm* — Suiter Swantz pc llo

(57) ABSTRACT

A headrest adjusting bracket surrounds posts from the headrest. A screw displaces one side of the bracket to apply a frictional force to the headrest posts. Protrusions on the interior surface of the bracket, proximal to each post, increases the surface area contact between the bracket and the posts when the screw is tightened.

13 Claims, 4 Drawing Sheets

ADJUSTABLE SINGLE AXIS TENSIONER FOR MOVABLE AIRCRAFT HEADRESTS

BACKGROUND

Adjustable headrests in aircraft are challenging to implement. Complicated systems are prone to failure in the heavy usage environment of an aircraft. Furthermore, existing headrest devices are heavy and expensive. It would be advantageous to have a light, simple, inexpensive aircraft headrest adjusting device.

SUMMARY

In one aspect, embodiments of the inventive concepts disclosed herein are directed to a headrest adjusting bracket that surrounds posts from the headrest. A screw displaces one side of the bracket to apply a frictional force to the headrest posts.

In a further aspect, protrusions on the interior surface of the bracket, proximal to each post, increases the surface area contact between the bracket and the posts when the screw is tightened.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1A:
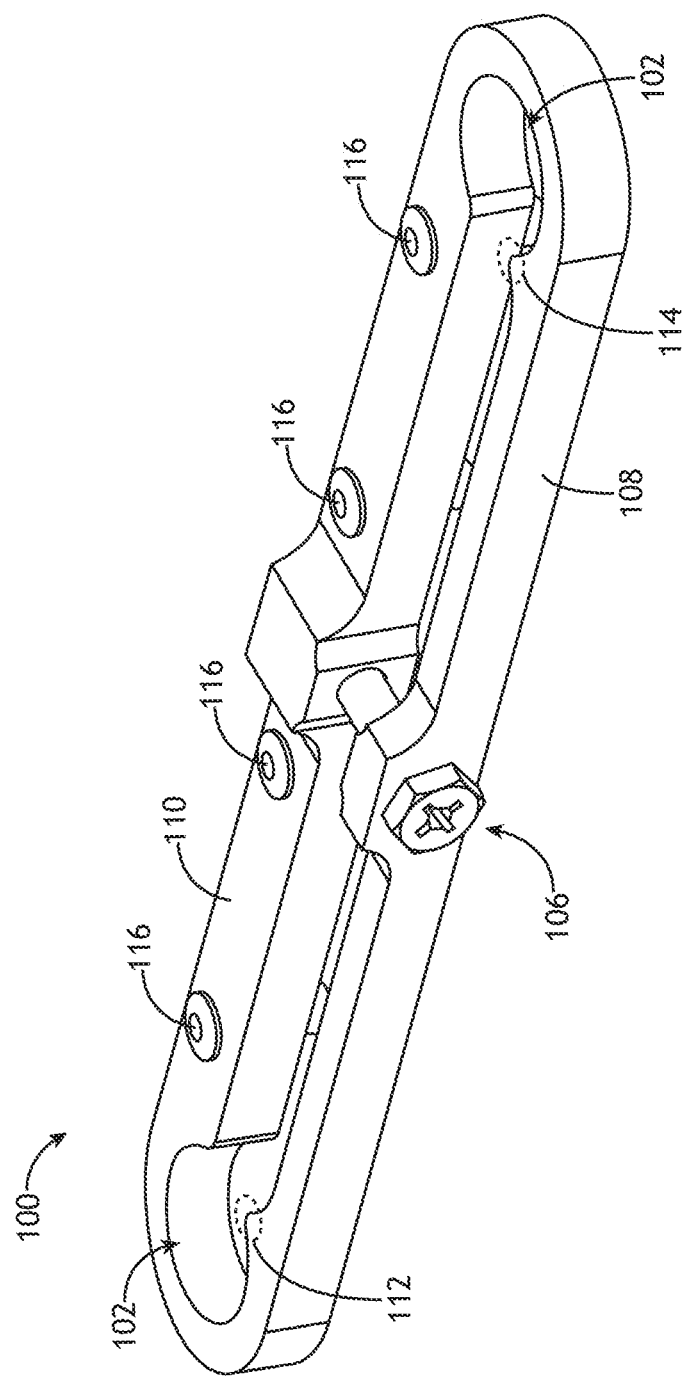
FIG. 1A shows a perspective view of a headrest tensioner according to an exemplary embodiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a headrest adjusting bracket that surrounds posts from the headrest. A screw displaces one side of the bracket to apply a frictional force to the headrest posts. Protrusions on the interior surface of the bracket, proximal to each post, increases the surface area contact between the bracket and the posts when the screw is tightened.

Figure 1B:
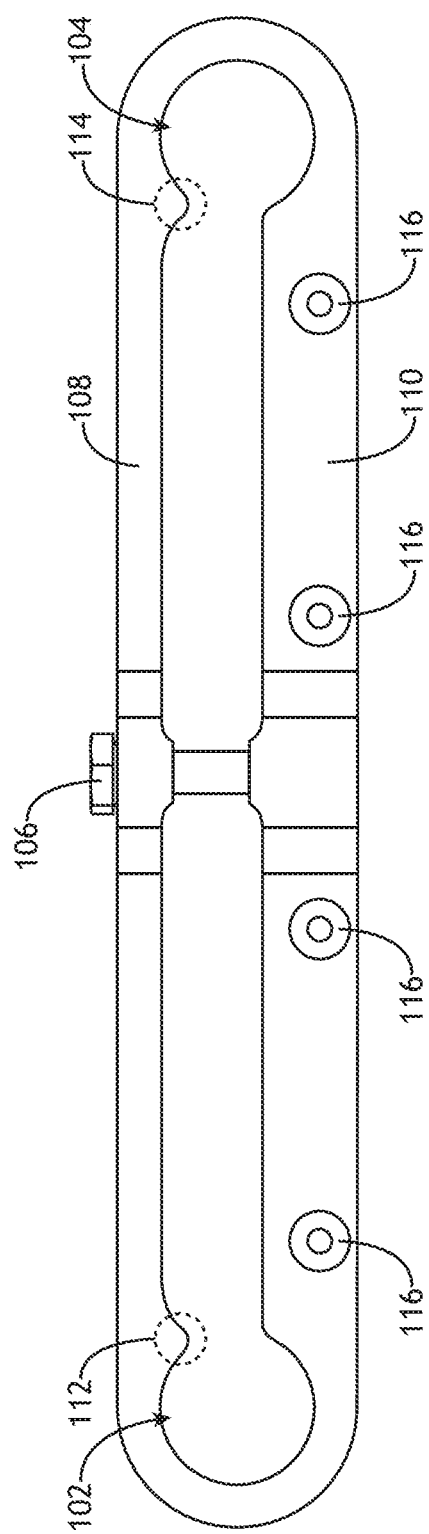
FIG. 1B shows a bottom view of a headrest tensioner according to an exemplary embodiment.

Referring to FIGS. 1A-1B, a perspective view and bottom view of a headrest tensioner bracket 100 according to an exemplary embodiment are shown. The headrest tensioner bracket 100 comprises a bracket body having a first side 108 and a second side 110 that define an internal gap. The bracket body defines two or more headrest post engaging portions 102, 104. When disposed in an aircraft seat, headrest posts pass through the two or more headrest post engaging portions 102, 104. The first side 108 of the bracket body is displaceable via a tensioning element 106 toward the second side 110. Such displacement tends to slightly decrease the size of the two or more headrest post engaging portions 102, 104 to create tension of the corresponding headrest posts.

In at least one embodiment, the tensioning element 106 may comprise a screw configured to pass through the first side 108 and threadedly engage the second side 110. Alternatively, the tensioning element 106 may a bolt that completely passes through the first side 108 and second side 110 and engages a nut. The tensioning element 106 is an adjustable component that allows an installer to set the tensioning element 106 at installation time to apply a desired tension or force to the headrest posts by reducing the effective diameter of the headrest post engaging portions 102, 104 according to a desired specification of headrest resistance.

In at least one embodiment, the bracket body defines protrusions 112, 114 proximal to each of the two or more headrest post engaging portions 102, 104. The protrusions 112, 114 increase the surface area contact between the internal surfaces of the two or more headrest post engaging portions 102, 104 and the corresponding headrest posts. Such increased surface area enhances the effectiveness of the bracket body create tensions, and also spreads the load to reduce the risk of fatigue to the bracket body. The two or more headrest post engaging portions 102, 104 may be disposed on the first side 108 and/or the second side 110.

In at least one embodiment, the second side 110 of the bracket body may define two or more frame attachment portions configured to receive corresponding frame attachment elements 116 that affix the headrest tensioner bracket 100 an internal surface of an aircraft seat frame. The attachments elements 116 may comprise bolts or rivets. In at least one embodiment, the second surface 110 may have a greater cross-sectional thickness than the first side 108 to control the mode of displacement (the first side 108 displacing toward the internal gap) and to prevent excess fatigue at the frame attachment portions.

Figure 2A:
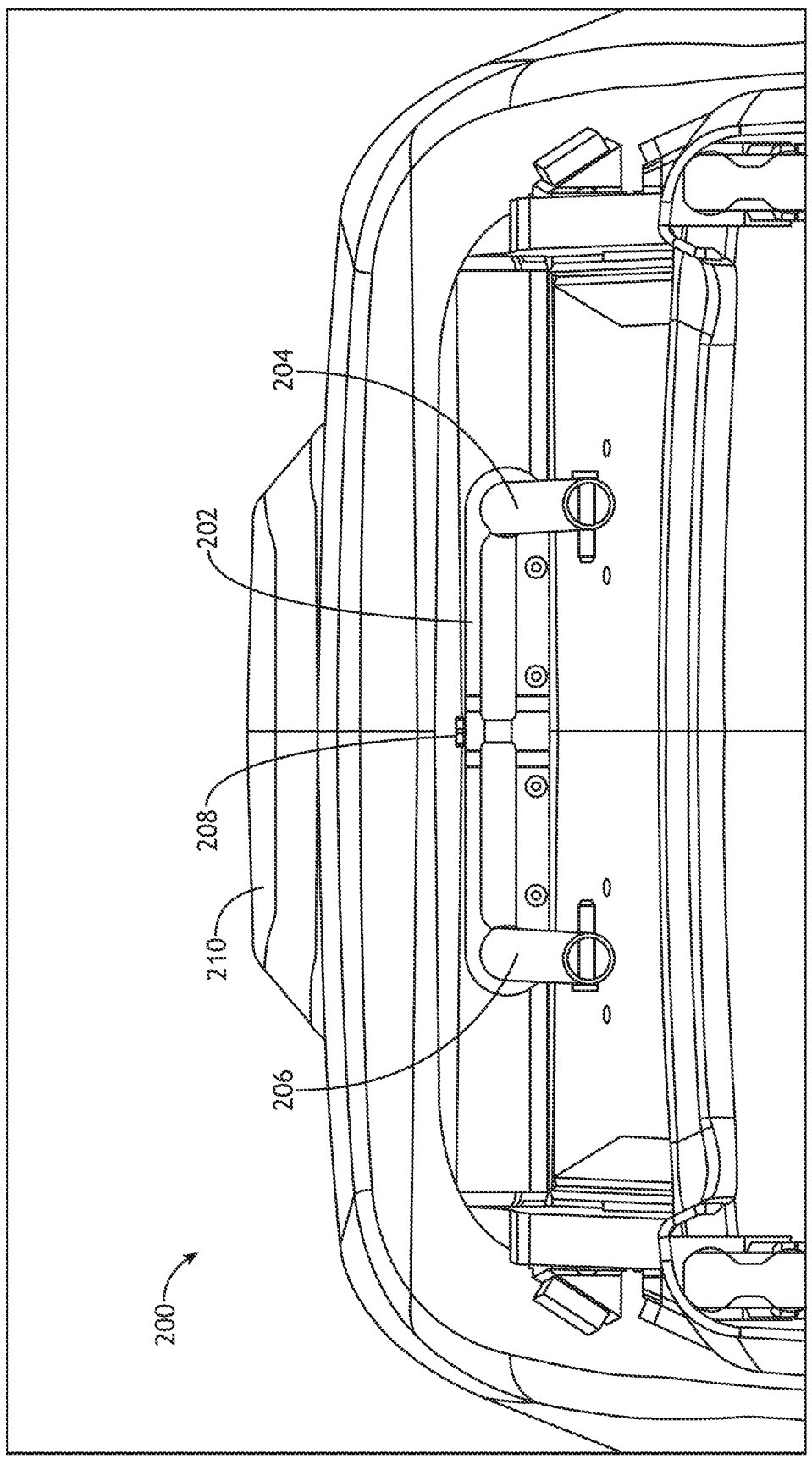
FIG. 2A shows a bottom, environmental view of an aircraft seat including an exemplary embodiment.
Figure 2B:
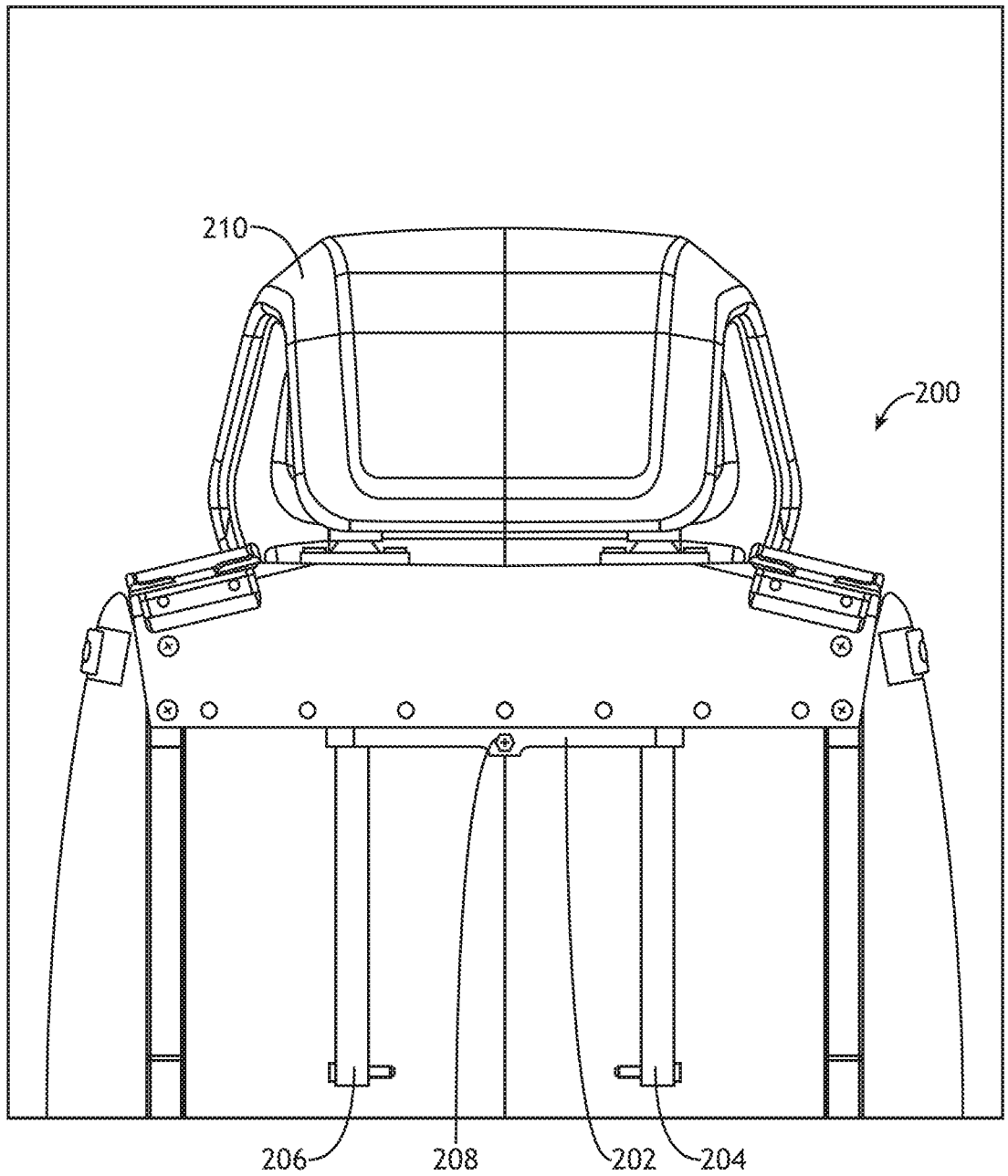
FIG. 2B shows a rear, environmental view of an aircraft seat including an exemplary embodiment.

Referring to FIGS. 2A-2B, bottom and rear environmental views of an aircraft seat 200 including an exemplary embodiment are shown. The aircraft seat 200 includes a headrest tensioning bracket 202 that receives two or more headrest posts 204, 206 of a corresponding headrest 210 in corresponding headrest post engaging portions defined by the headrest tensioning bracket 202. A tensioning element 208 of the headrest tensioning bracket 202 may be tightened to collapse the headrest tensioning bracket 202 and increase pressure on the headrest posts 204, 206 to create resistance to the deployment and stowage of the headrest 210. In at least one embodiment, the tensioning element 208 may be set at the time of installation according to a desired level or resistance. The tensioning element 108 may then consistently retain the level of resistance for the service life of the aircraft seat 200.

In at least one embodiment, the headrest tensioning bracket 202 is disposed on a bottom, internal surface of the aircraft seat frame 212, opposite the headrest 210.

In at least one embodiment, the headrest tensioning bracket 202 comprises a wear resistant plastic; for example, Nylon 66.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. An aircraft headrest adjusting bracket comprising:
    a bracket body having a first side and a second side, the bracket body defining at least two headrest post engaging portions and an internal gap separating the first side and the second side, and at least two protrusions disposed on an interior surface defining the internal gap, each proximal to a corresponding headrest post engaging portion; and
    a tensioning element engaging the first side and the second side,
    wherein the tensioning element is configured to displace the first side toward the second side to create tension between the bracket body and headrests posts disposed within headrest post engaging portions.

2. The aircraft headrest adjusting bracket of claim 1, wherein the tensioning element comprises a screw configured to pass through the first side and threadedly engage the second side.

3. The aircraft headrest adjusting bracket of claim 2, wherein the second side defines two or more aircraft seat connection portions.

4. The aircraft headrest adjusting bracket of claim 3, wherein the bracket body further comprises at least two protrusions disposed on an interior surface of the first side, each proximal to a corresponding headrest post engaging portion.

5. The aircraft headrest adjusting bracket of claim 3, wherein the second side has a greater cross-sectional thickness than the first side.

6. The aircraft headrest adjusting bracket of claim 1, wherein the bracket body comprises Nylon 66.

7. An aircraft seat comprising:
    a headrest comprising at least two posts configured to engage a seat frame; and
    an aircraft headrest adjusting bracket disposed on an internal surface of the seat frame, comprising:
        a bracket body having a first side and a second side, the bracket body defining at least two headrest post engaging portions and an internal gap separating the first side and the second side, and at least two protrusions disposed on an interior surface defining the internal gap, each proximal to a corresponding headrest post engaging portion; and
        a tensioning element engaging the first side and the second side,
        wherein the tensioning element is configured to displace the first side toward the second side to create tension between the bracket body and the headrests posts when disposed within headrest post engaging portions.

8. The aircraft seat of claim 7, wherein the at least two protrusions are disposed on an interior surface of the second side.

9. The aircraft seat of claim 7, wherein the tensioning element comprises a screw configured to pass through the first side and threadedly engage the second side.

10. The aircraft seat of claim 9, wherein the second side defines two or more aircraft seat connection portions.

11. The aircraft seat of claim 10, wherein the bracket body further comprises at least two protrusions disposed on an interior surface of the first side, each proximal to a corresponding headrest post engaging portion.

12. The aircraft seat of claim 10, wherein the second side has a greater cross-sectional thickness than the first side.

13. The aircraft seat of claim 7, wherein the bracket body comprises Nylon 66.

\* \* \* \* \*